United States Patent
Yang

(10) Patent No.: US 7,976,757 B2
(45) Date of Patent: Jul. 12, 2011

(54) MOLD DECORATION PROCESS

(75) Inventor: Jung-Feng Yang, Hsin Chuang (TW)

(73) Assignee: Ju Teng International Holdings Limited, Hong Kong (HK)

( * ) Notice: Subject to any disclaimer, the term of this patent is extended or adjusted under 35 U.S.C. 154(b) by 0 days.

(21) Appl. No.: 12/548,488

(22) Filed: Aug. 27, 2009

(65) Prior Publication Data
US 2011/0049755 A1    Mar. 3, 2011

(51) Int. Cl.
   *B29C 45/14*    (2006.01)
   *B29C 51/10*    (2006.01)
   *B29C 51/08*    (2006.01)

(52) U.S. Cl. ........ 264/255; 264/513; 264/250; 264/294; 264/296; 264/297.3; 264/297.6; 264/297.8

(58) Field of Classification Search .................. None
   See application file for complete search history.

(56) References Cited

U.S. PATENT DOCUMENTS

| | | | | |
|---|---|---|---|---|
| 4,508,499 A | * | 4/1985 | Spengler | 425/88 |
| 4,639,341 A | * | 1/1987 | Hanamoto et al. | 264/40.1 |
| 4,676,938 A | * | 6/1987 | Karklin et al. | 264/46.5 |
| 4,885,121 A | * | 12/1989 | Patel | 264/255 |
| 5,030,406 A | * | 7/1991 | Sorensen | 264/255 |
| 5,474,134 A | * | 12/1995 | Spotzl et al. | 156/475 |
| 5,811,039 A | * | 9/1998 | Addeo et al. | 264/46.4 |
| 6,036,908 A | * | 3/2000 | Nishida et al. | 264/254 |
| 6,475,423 B1 | * | 11/2002 | Masterson et al. | 264/511 |
| 6,863,853 B2 | * | 3/2005 | Brewitz et al. | 264/132 |
| 2009/0174121 A1 | * | 7/2009 | Hayes et al. | 264/447 |

* cited by examiner

*Primary Examiner* — Edmund H. Lee
(74) *Attorney, Agent, or Firm* — Alan Kamrath; Kamrath & Associates PA

(57) ABSTRACT

An in mold decoration process includes inserting a film with decorations into a first mold tool cavity side. The first mold tool cavity side is then engaged with a first mold tool core side, and the film in the first mold tool cavity side undergoes a high-pressure heat forming procedure. After the forming procedure, the film is formed with a cavity and maintained in the first mold tool cavity side. The first mold tool cavity side is then disengaged from the first mold tool core side and engaged with a second mold tool core side, and the film undergoes an injection molding procedure. The cavity is injected with a molten resin. After the molding procedure, the molten resin becomes a plastic component bound to the film to form a semi-finished product. The semi-finished product is then ejected out of the first mold tool cavity side and trimmed to form a finished product.

17 Claims, 10 Drawing Sheets

MOLD DECORATION PROCESS

BACKGROUND OF THE INVENTION

1. Field of the Invention

The present invention relates to an in mold decoration process and, in particular, to a speed improvement to the process, with the process offering an improved accuracy and registration of decorations.

2. Description of the Related Art

IMD (In Mold Decoration) is a method that has been widely used to decorate a part with colors and patterns. This technology is generally classified in three techniques, namely IMF (In Mold Forming), IML (In Mold Label) and IMR (In Mold Rolling). The IMF or IML process includes decorating a film with colors and designs and placing the film into an injection mold tool so that the film undergoes an injection molding procedure. After the injection molding procedure, the film is bounded to a plastic surface. The process enables a plastic part to be quickly decorated and reduces the cost of manufacture. In the IMF and IML processes, the film is reserved and utilized to serve as a protective layer on the surface of the plastic part. In the IMR process, colors and designs are printed directly to a part that is to be decorated.

In the conventional IMF process, the film is inserted into a forming mold tool and undergoes a high-pressure forming procedure to form a shape which fits to the profile of the forming mold tool. Further, the film is manually removed from the forming mold tool and is manually inserted into an injection mold tool. Further, the film is injected with molten resin, and the molten resin is solidified and bound to the film. The conventional IMF process requires a person to remove the film from the forming mold tool and insert it into the injection mold tool. However, it is time-consuming and non-economical. Further, once the film is removed from the forming mold tool, it is impossible to precisely insert the film into the injection mold tool without encountering positioning error. Further, since the film is liable to deformation due to a temperature variation, it is difficult to insert into the injection mold tool. In this regard, the molten resin is not injected accurately on a predetermined position of the film, resulting in a low yield rate. The production time of the process is not effectively reduced. It is noted that a notebook case has a gross profit margin of 3%~5%, and any defect would incur an increase in manufacturing cost.

The present invention is, therefore, intended to obviate or at least alleviate the problems encountered in the prior art.

SUMMARY OF THE INVENTION

According to the present invention, an in mold decoration process includes inserting a film with decorations into a first mold tool cavity side. The first mold tool cavity side is then engaged with a first mold tool core side, and the film in the first mold tool cavity side undergoes a high-pressure heat forming procedure. After the forming procedure, the film is formed with a cavity and maintained in the first mold tool cavity side. The first mold tool cavity side is then disengaged from the first mold tool core side and engaged with a second mold tool core side. The film undergoes an injection molding procedure. The cavity is injected with a molten resin. After the molding procedure, the molten resin becomes a plastic component bound to the film to form a semi-finished product. The semi-finished product is then ejected out of the first mold tool cavity side and trimmed to form a finished product.

It is an object of the present invention that it is unnecessary to remove the film from the first mold tool cavity side during the process. Thus, the film does not encounter position errors with respect to the first and second mold tool core sides.

It is another object of the present invention that the process doesn't require a person to transfer the film to different mold tools as set forth in the "Description of the Related Art".

Other objects, advantages, and new features of the present invention will become apparent from the following detailed description of the invention when considered in conjunction with the accompanied drawings.

DETAILED DESCRIPTION OF THE PREFERRED EMBODIMENT

Figure 1:
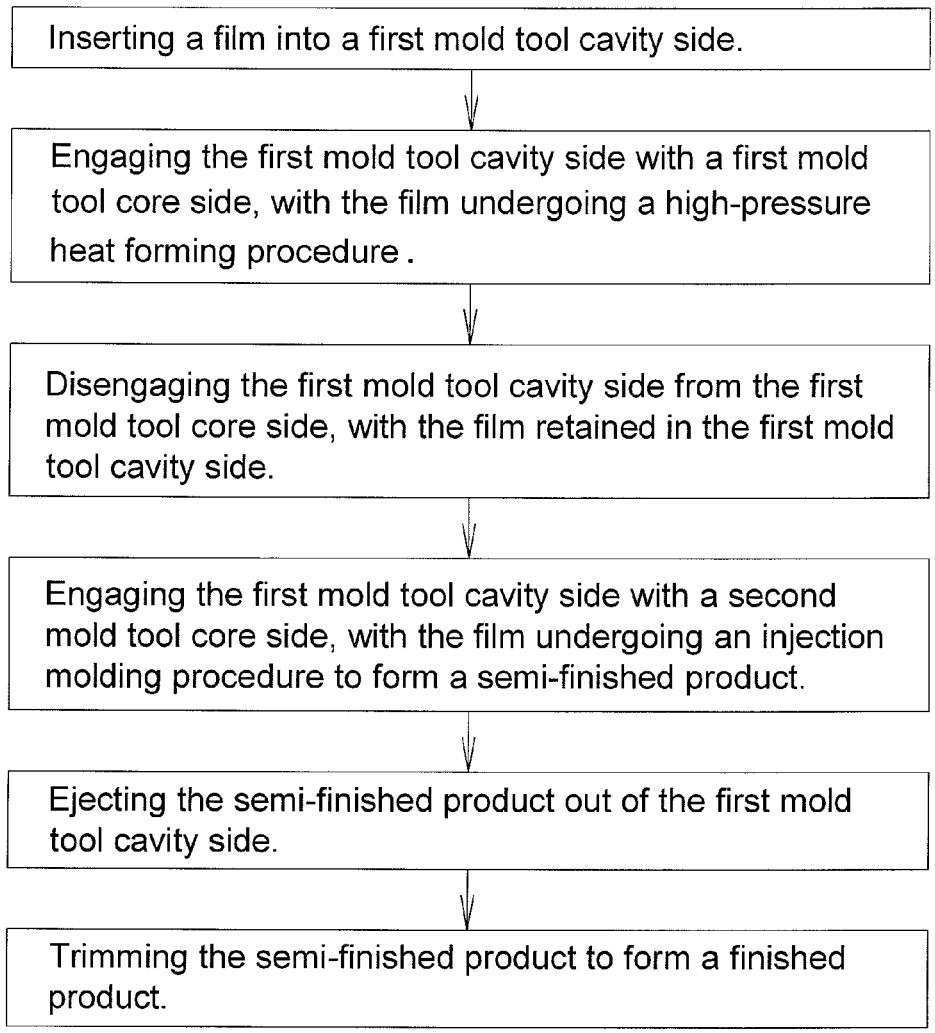
FIG. 1 is a flow chart for an in mold decoration process in accordance with the present invention.
Figure 2:
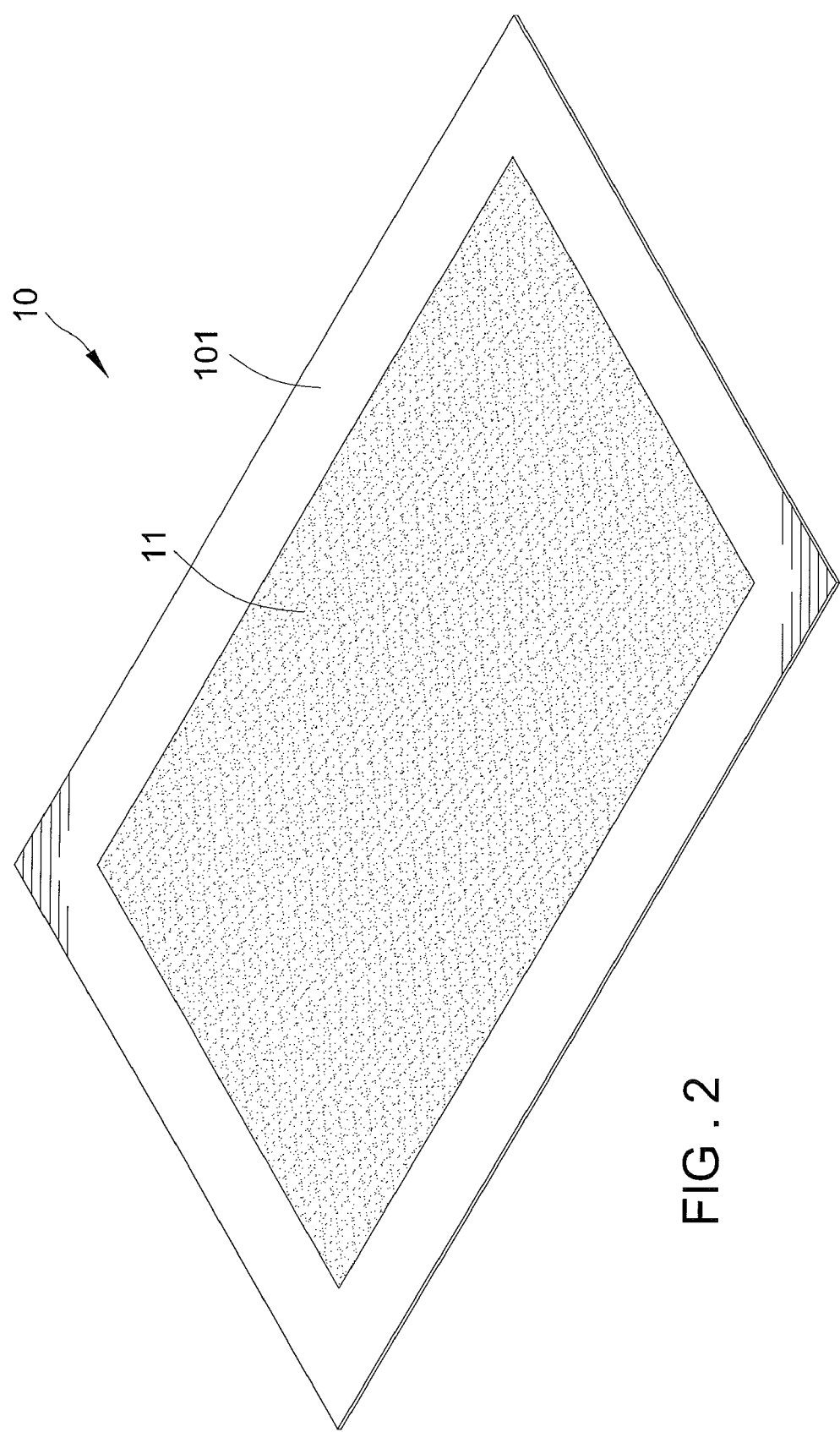
FIG. 2 is a perspective view of a film which is formed with decorations.
Figure 3:
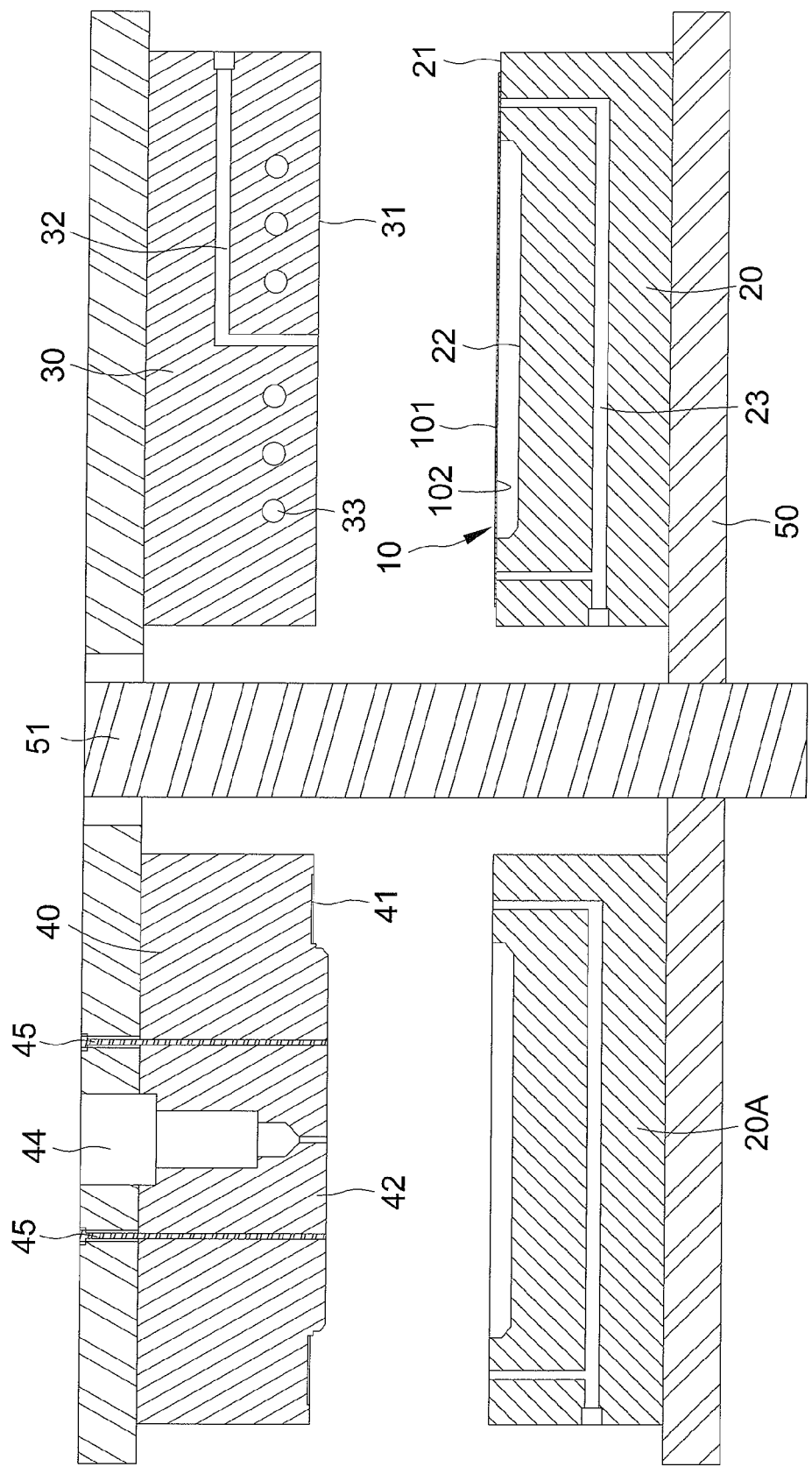
FIG. 3 is a schematic view showing two first mold tool cavity sides and the film inserted into one first mold tool cavity side.
Figure 4:
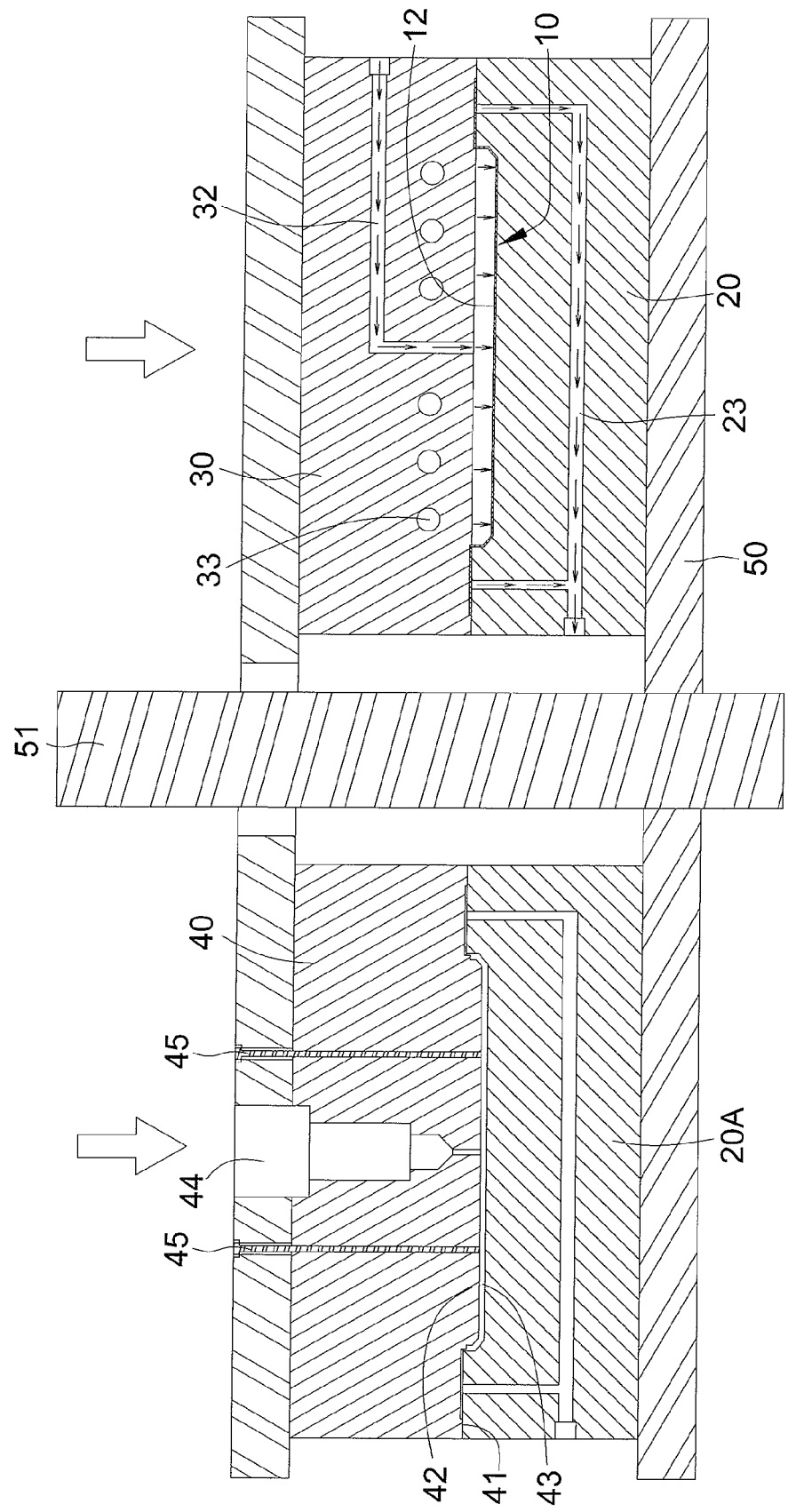
FIG. 4 is an extended view of FIG. 3 and shows a first mold tool core side engaged with the one mold tool cavity side and the film forced into a mold shape of the one mold tool cavity side through a high-pressure heat forming procedure.
Figure 5:
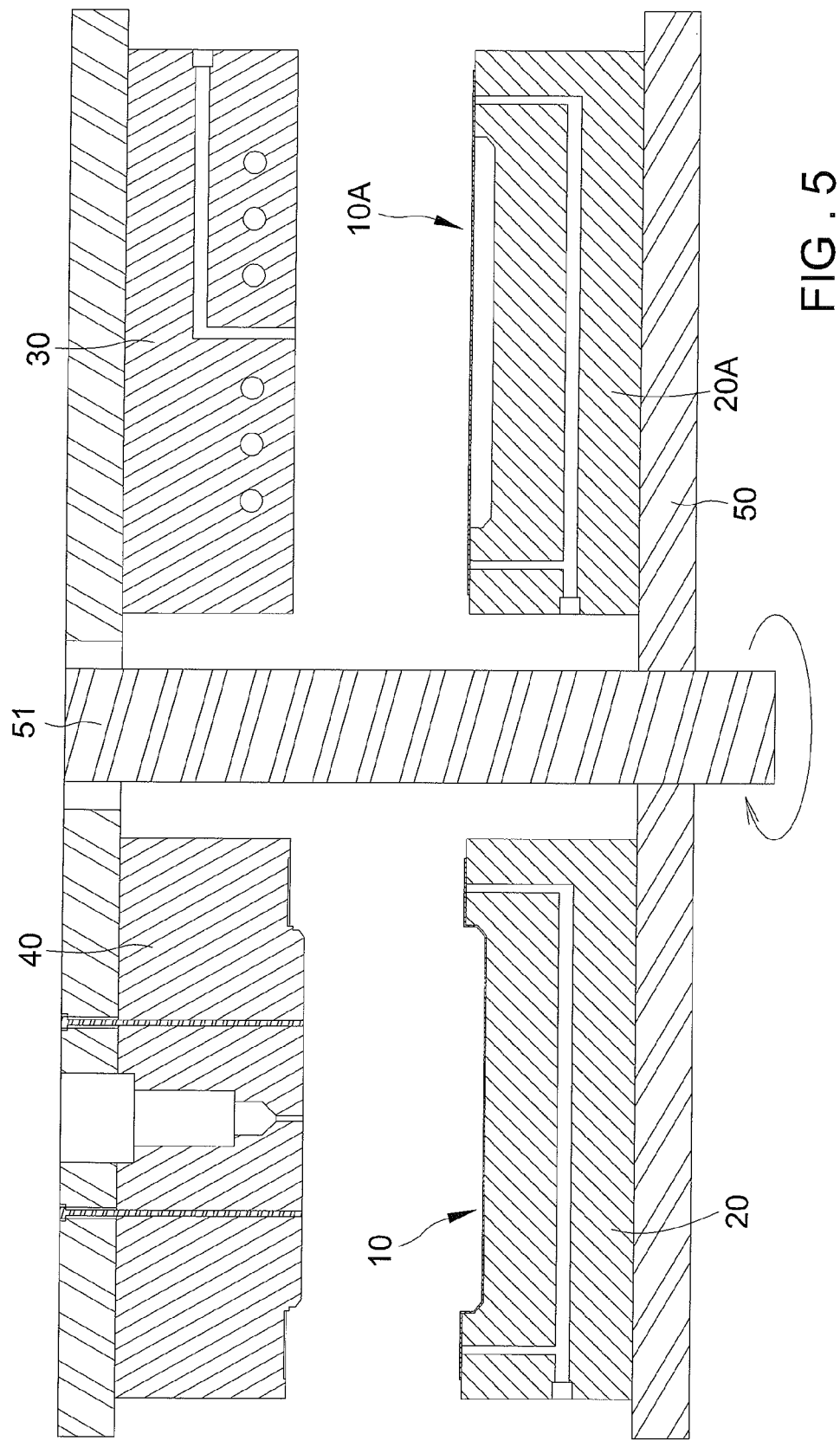
FIG. 5 is an extended view of FIG. 4 and shows the two first mold tools cavity side interchanged in positions and other film inserted into other first mold tool cavity side.
Figure 6:
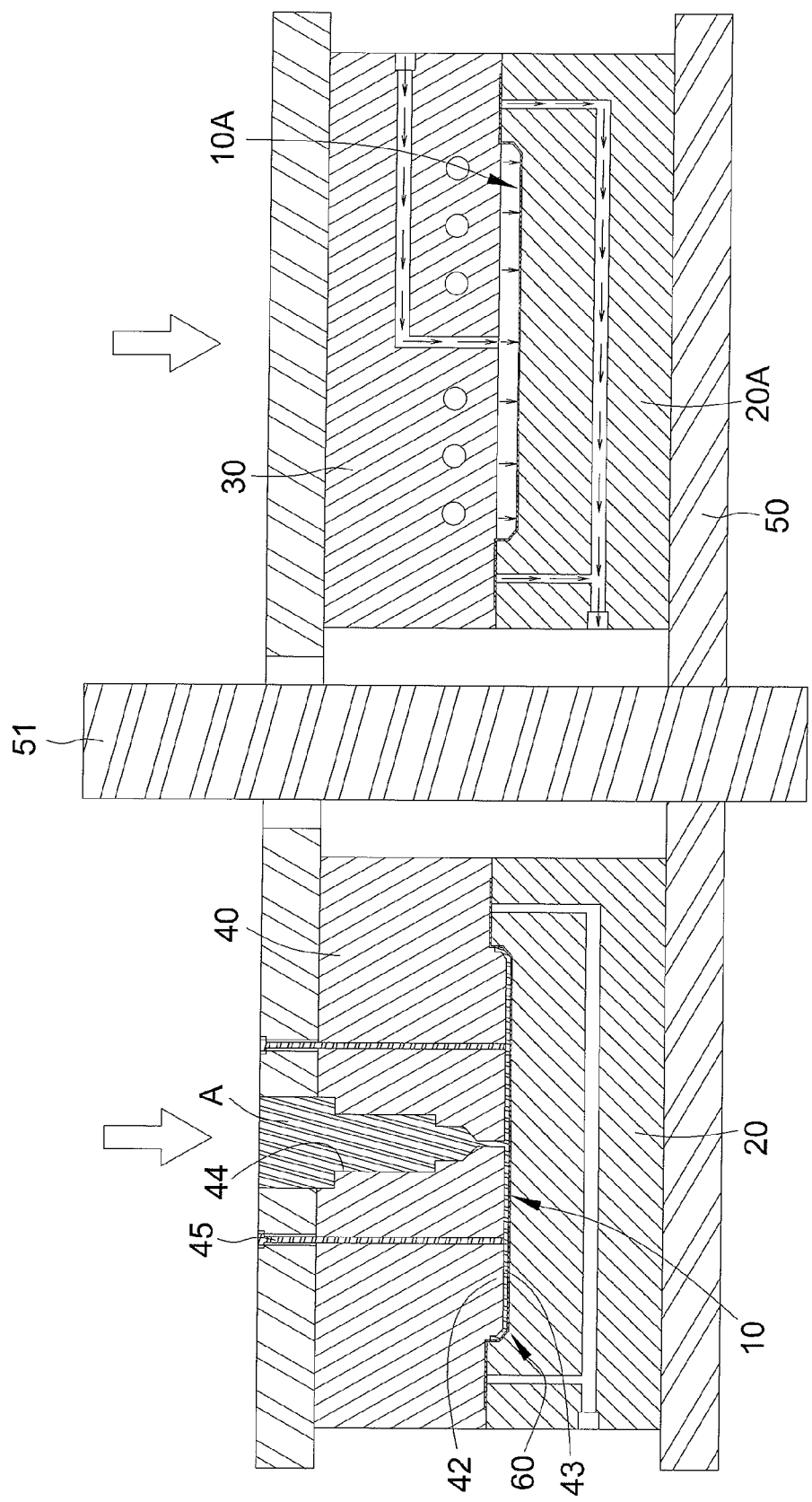
FIG. 6 is an extended view of FIG. 5 and shows a second mold tool core side engaged with the one first mold tool cavity side, with the film undergoing an injection molding procedure, and the other film forced into a mold shape of the other mold tool cavity side through a high-pressure heat forming procedure.
Figure 7:
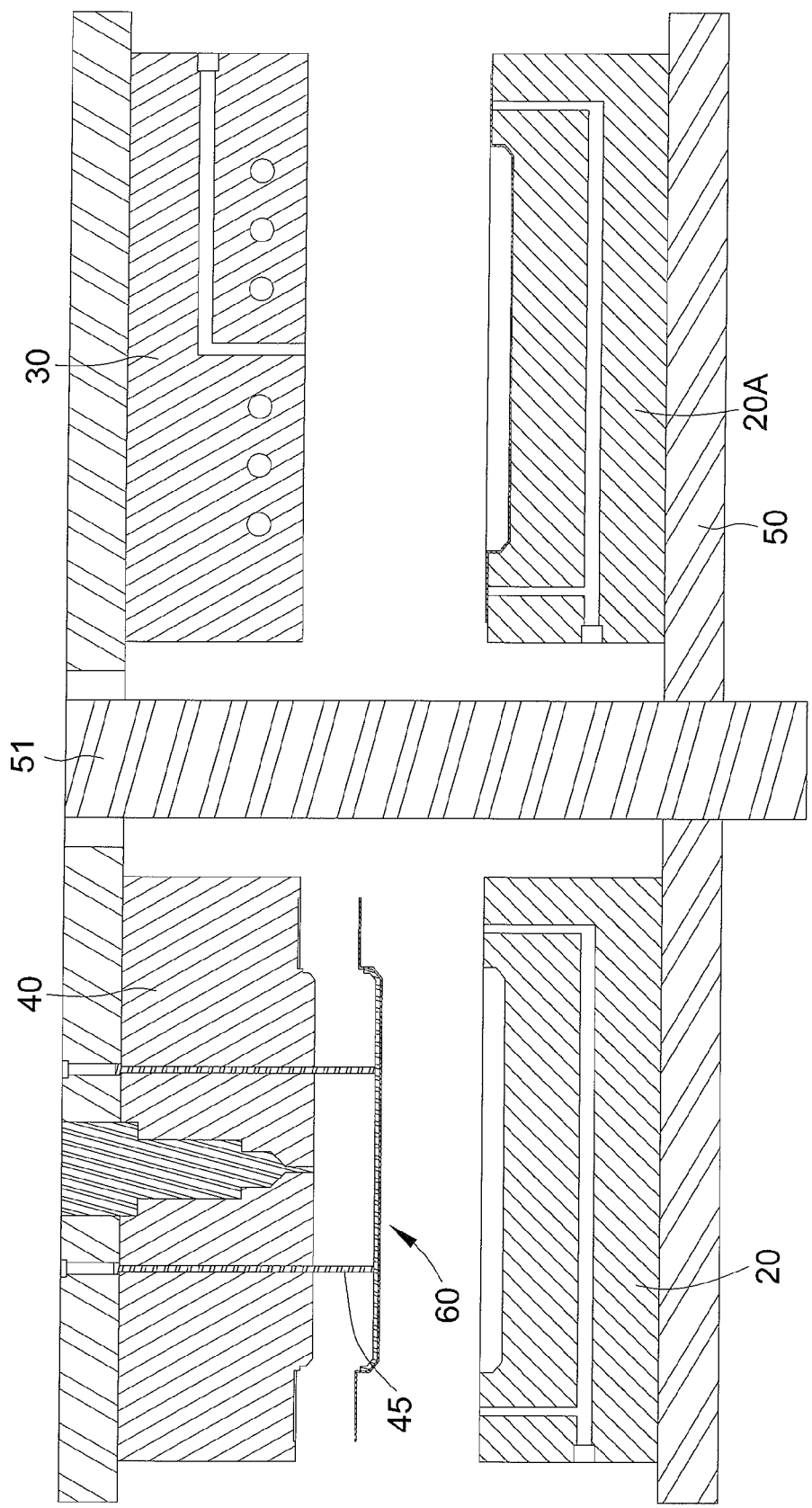
FIG. 7 is an extended view of FIG. 6 and shows a plastic component bound to the film, the film ejected out of the one first mold tool cavity side, and the second mold tool core side disengaged from the first mold tool cavity side.

Referring to the drawings, a device for an in mold decoration process in accordance with the present invention includes two first mold tool cavity sides 20 and 20A mounted on a base side of a rotating member 50. The rotating member 50 is rotatable about an axle 51, and the first mold tool cavity sides 20 and 20A are disposed on different sides of the axle 51. Each of the first mold tools cavity sides 20, 20A includes a joint face 21, and a forming section 22 extended from the joint face 21. Preferably, the forming section 22 defines a hollow. Additionally, each of the first mold tool cavity sides 20 and 20A includes a negative pressure piping 23 extended from and connected with the joint face 21. Further, the device includes a first mold tool core side 30 and a second mold tool core side 40. The first mold tool core side 30 includes a joint face 31, a positive pressure piping 32 extended from and connected with the joint face 31, and a thermo piping 33 for heating the first mold tool core side 30. The second mold tool core side 40 includes a joint face 41, and a forming section 42 protruded from the joint face 41. Preferably, the forming section 42 includes a shape corresponding to the forming sections 22 of the related first mold tool cavity sides 20 and 20A. Additionally, the second mold tool core side 40 includes a passage 44 and an ejecting member 45 extended to a surface of the forming section 42. The passage 44 is utilized to deliver molten resin "A". The ejecting member 45 can extend outside the surface of the forming section 42. Preferably, the second mold tool core side 42 includes two ejecting members 45. Preferably, the two ejecting members 45 may be disposed on different sides of the passage 44.

FIG. 1 shows a flow chart of the in mold process in accordance with the present invention. The in mold process includes inserting a film 10 into the first mold tool cavity side 20. Generally, the film 10 includes a film carrier which is preferably made of plastic, an ink layer, an adhesion layer, a film substrate and an UV layer. The film 10 is flat and defines a first surface 101 and a second surface 102 opposite to the first surface 101. The first surface 101 includes a decoration 11 formed thereon. Further, the film 10 is disposed above the forming section 22 and includes a perimeter connected with the joint face 21. The first mold tool core side 30 is then engaged with the first mold tool cavity side 20 such that the respective joint face 31 and 21 are in contact with each other. Further, the forming section 22 includes a bottom edge spaced from the joint face 31 of the first mold tool core side 30. The film 10 is then forced into a shape of the forming section 22 of the first mold tool cavity side 20 through a high-pressure heat forming procedure. In the high-pressure heat forming procedure, the thermo piping 33 heats the first mold tool core side 30 to soften the film 10, and the positive pressure piping 32 of the first mold tool core side 30 applies a positive pressure on the decoration 11 disposed on the first surface 101 of the film 10 while the negative pressure piping 23 of the first mold tool cavity side 20 applies a negative pressure on the perimeter and the second surface 102 of the film 10. Thus, the film 10 is formed with a cavity 12 corresponding to the shape of the forming section 22. The first mold tool core side 30 is then disengaged from the first mold tool cavity side 20, and the first mold tool cavity side 20 is rotated by the rotating member 50 such that the first mold tools cavity side 20 and 20A interchange in positions. Additionally, other film 10A is adapted to be inserted into the first mold tool cavity side 20A. The second mold tool core side 40 is then engaged with the first mold tool cavity side 20 such that the respective joint face 41 and 21 are in contact with each other. Further, the forming section 42 is disposed in the forming section 22, and the surface of the forming section 42 and a bottom edge of the film 10 is spaced from each other and define an area 43 to be filled with the molten resin "A". The film 10 then undergoes an injection molding procedure. Additionally, the other film 10A can be forced into a mold shape of the first mold tool cavity side 20A concurrently. After the injection molding procedure, the second mold tool core side 40 is disengaged from the first mold tool cavity side 20, and the molten resin becomes a plastic component. The plastic component is bound to the film 10 to form a semi-finished product 60, and the semi-finished product 60 is ejected out of the first mold tool cavity side 20 by the ejecting members 45 stably.

Figure 8:
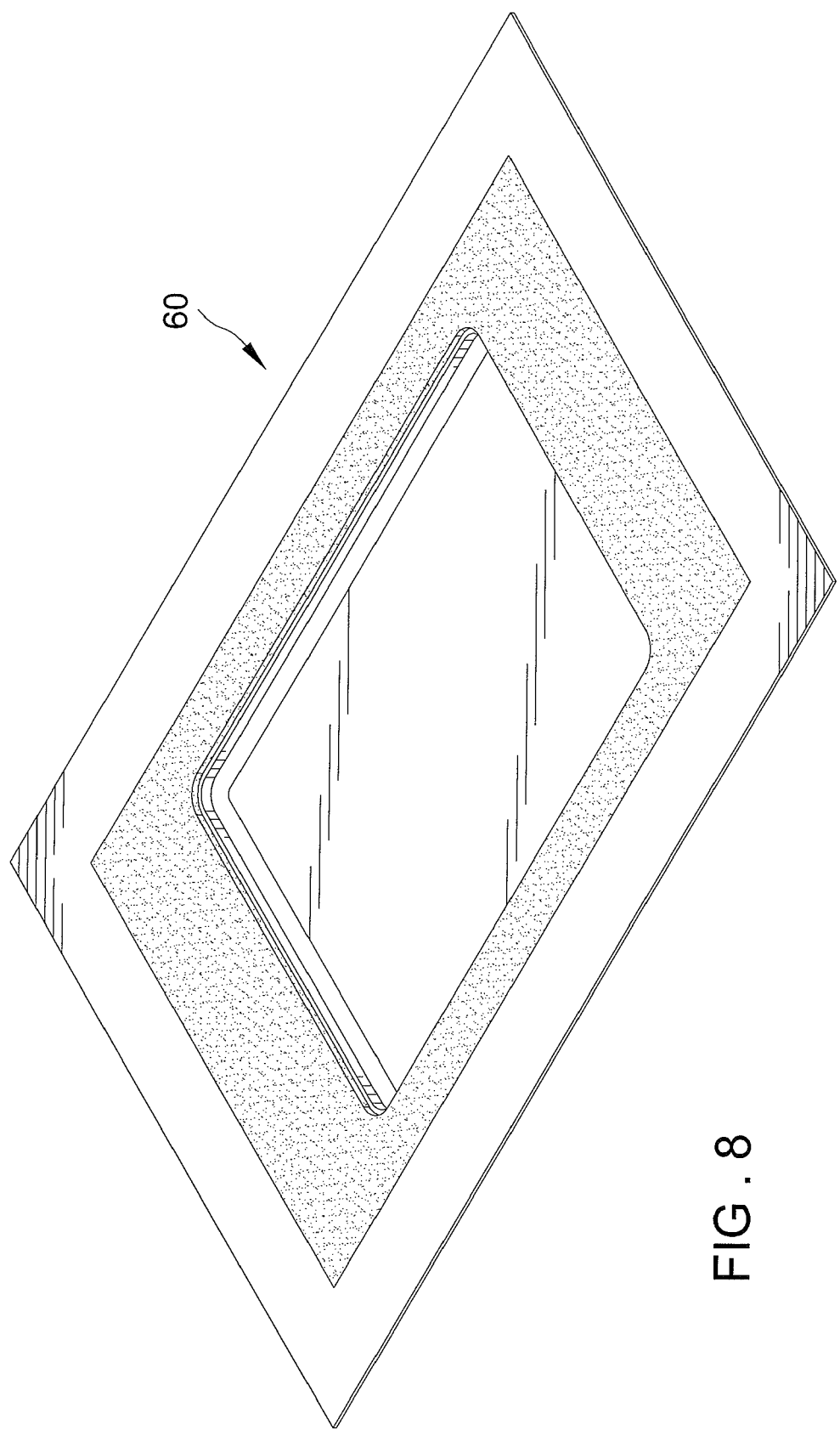
FIG. 8 is a perspective view of the combined film and plastic component shown in FIG. 7.
Figure 9:
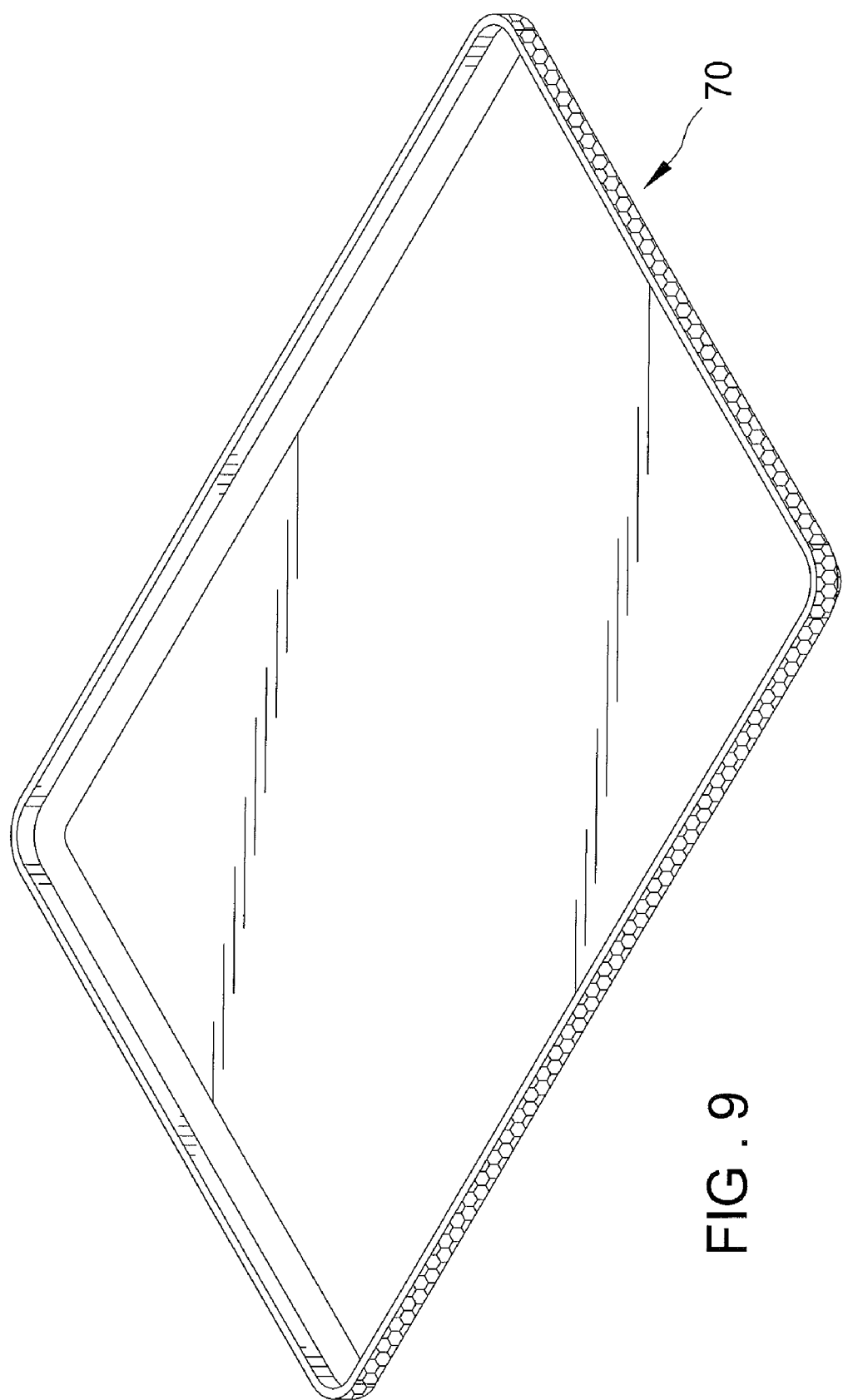
FIG. 9 is a perspective view similar to FIG. 8 but shows a combination product of the film and the plastic component trimmed to form a finished product.
Figure 10:
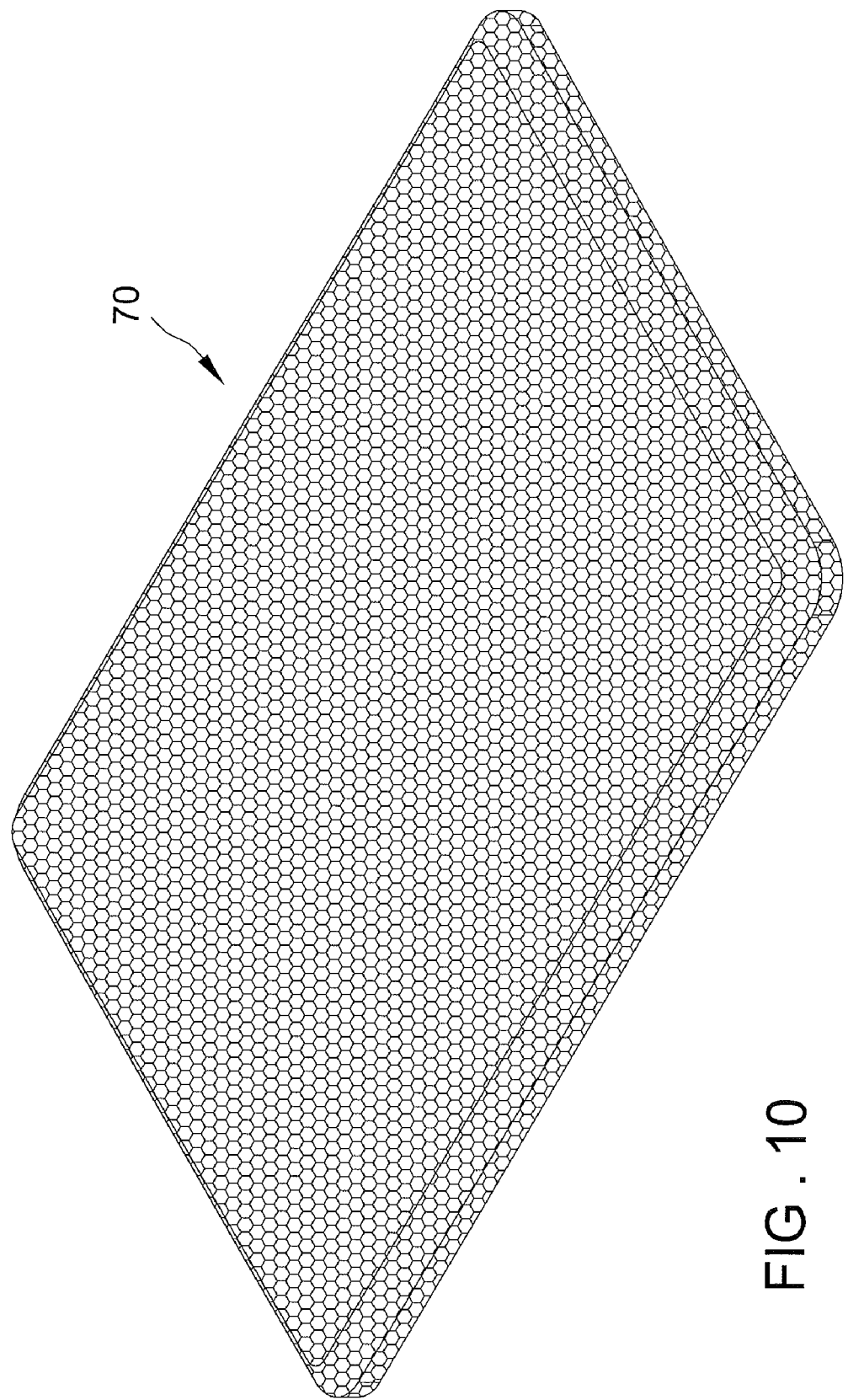
FIG. 10 is a perspective view of the finished product taken at a different angle.

FIGS. 8 through 10 show that the semi-finished product 60 trimmed to form a finished product 70.

In view of forgoing, it is unnecessary to remove the film 10 from the first mold tool cavity side 20 during the process. In this regard, the film 10 does not encounter position errors with respect to the first and second mold tool core side 30 and 40. Further, the process doesn't require a person to transfer the film 10 to different mold tools as set forth in the "Description of the Related Art".

Further, the two first mold tool cavity sides 20 and 20A are utilized and selectively engaged with the first and second mold tool core sides 30 and 40 to achieve a continuous cycle, resulting an increase in the yield rate.

While the specific embodiments have been illustrated and described, numerous modifications come to mind without significantly departing from the spirit of invention, and the scope of invention is only limited by the scope of the accompanying claims.

What is claimed is:

1. An in mold decoration process comprising:
    inserting a film having decorations formed thereon into a first mold tool cavity side;
    engaging the first mold tool cavity side with the inserted film with a first mold tool core side with the inserted film undergoing a high-pressure heat forming procedure and formed with a cavity thereafter;
    engaging another first mold cavity side with a second mold tool core side simultaneously as the first mold cavity tool cavity side engages with the first mold tool core side;
    disengaging the first mold tool cavity side from the first mold tool core side while the film is retained in the first mold tool cavity side and disengaging the other first mold cavity side from the second mold tool core side simultaneously as the first mold tool cavity side disengages from the first mold tool core side;
    after disengaging, engaging the first mold tool cavity side with the retained film with the second mold tool core side, with the retained film undergoing an injection molding procedure when the second mold tool core side is engaged to inject the cavity of the film with a molten resin, and with the molten resin becoming a plastic component bound to the film to form a semi-finished product and engaging the other first mold tool cavity side with the first mold core side simultaneously as the first mold tool cavity side engages with the second mold tool core side;
    ejecting the semi-finished product out of the first mold tool cavity side; and
    trimming the semi-finished product to form a finished product.

2. The process as claimed in claim 1 further comprising inserting another film having decorations formed thereon into the other first mold tool cavity side before the other first mold cavity side engages with the second mold tool core side, with the first mold tool cavity side selectively engaged with one of the first and second mold tool core sides while the other first mold tool cavity side is selectively engaged with another of the first and second mold tool core sides, and the one first mold tool cavity side selectively engaged with the other of the first and second mold tool core sides while the other first mold tool cavity side is selectively engaged with the one of the first and second mold tool core sides.

3. The process as claimed in claim 2 wherein the first mold tool cavity sides are disposed on a base side of a rotating member, wherein disengaging the first mold tool cavity side includes rotating the rotating member to align the first mold tool cavity sides with the first and second mold tool core sides.

4. The process as claimed in claim 1 wherein the first mold tool cavity side includes a first joint face and the first mold tool core side includes a second joint face contacted with the first joint face when in engagement therebetween, with the first mold tool cavity side including a first forming section extended therein and defining a space between a bottom edge of the first forming section and the second joint face.

5. The process as claimed in claim 4 wherein the second mold tool core side includes a third joint face and a second forming section protruded from the third joint face, with the second forming section disposed in the first forming section when in engagement therebetween, with the second forming section including a surface and the film including a bottom edge spaced from the surface to define an area.

6. The process as claimed in claim 5 wherein the injection molding procedure includes injecting the molten resin through a passage disposed in the second mold tool core side, with the resin injected in the area.

7. The process as claimed in claim 1 wherein the high-pressure heat forming procedure includes applying a positive pressure on a first surface of the film and applying a negative pressure on a second surface of the film opposite to the first surface of the film.

8. The process as claimed in claim 7 wherein the positive pressure is applied by a positive pressure piping disposed in the first mold tool core side, and wherein the negative pressure is applied by a negative pressure piping disposed in the first mold tool cavity side.

9. The process as claimed in claim 8 wherein the high-pressure heat forming procedure includes heating the first mold tool core side, with the first mold tool core side heated by a thermo piping disposed therein.

10. The process as claimed in claim 7 wherein the decoration is formed on the first surface of the film, and wherein the second surface is connected with the first mold tool cavity side.

11. The process as claimed in claim 1 wherein the semi-finished product is ejected out of the first mold tool cavity side by an ejecting member disposed in the second mold tool core side.

12. The process as claimed in claim 3 wherein the first mold tool cavity side includes a first joint face and the first mold tool core side includes a second joint face contacted with the first joint face when in engagement therebetween, with the first mold tool cavity side including a first forming section extended therein and defining a space between a bottom edge of the first forming section and the second joint face.

13. The process as claimed in claim 12 wherein the second mold tool core side includes a third joint face and a second forming section protruded from the third joint face, with the second forming section disposed in the first forming section when in engagement therebetween, with the second forming section including a surface and the film including a bottom edge spaced from the surface to define an area.

14. The process as claimed in claim 13 wherein the injection molding procedure includes injecting the molten resin through a passage disposed in the second mold tool core side, with the resin injected in the area.

15. The process as claimed in claim 3 wherein the high-pressure heat forming procedure includes applying a positive pressure on a first surface of the film and applying a negative pressure on a second surface of the film.

16. The process as claimed in claim 15 wherein the positive pressure is applied by a positive pressure piping disposed in the first mold tool core side, and wherein the negative pressure is applied by a negative pressure piping disposed in the first mold tool cavity side.

17. The process as claimed in claim 16 wherein the high-pressure heat forming procedure includes heating the first mold tool core side, with the first mold tool core side heated by a thermo piping disposed therein.

* * * * *